July 4, 1961    H. J. MODREY    2,990,597
RELEASABLE SELF-LOCKING COUPLING
Filed Sept. 14, 1959
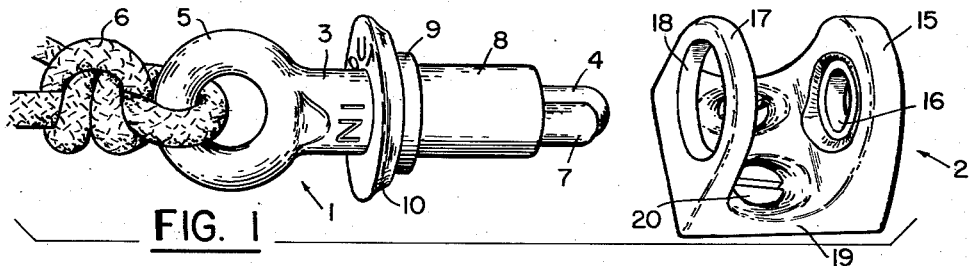
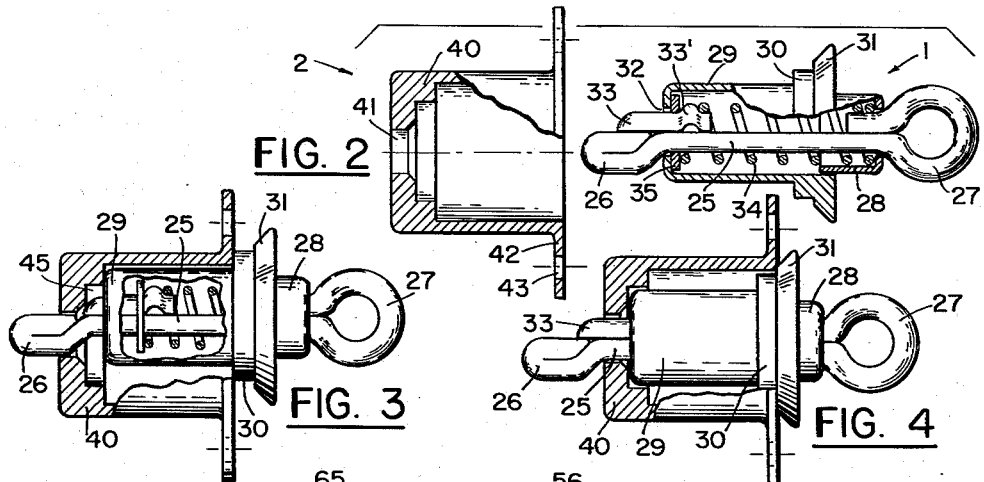
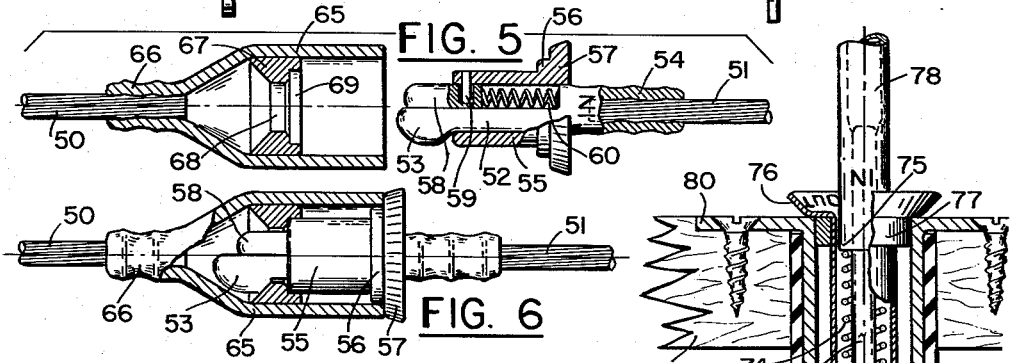
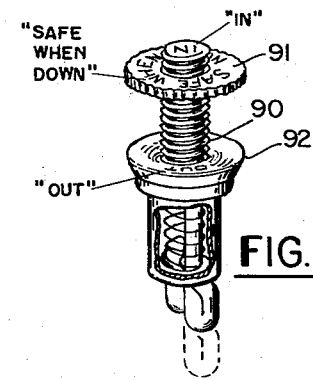
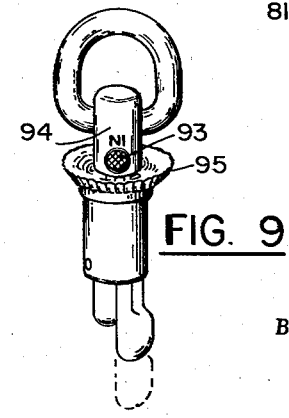
INVENTOR.
HENRY J. MODREY
BY Hause and Nydick
ATTORNEYS United States Patent Office 2,990,597
Patented July 4, 1961

2,990,597
RELEASABLE SELF-LOCKING COUPLING
Henry J. Modrey, Eagle Drive, Stamford, Conn.
Filed Sept. 14, 1959, Ser. No. 839,780
17 Claims. (Cl. 24—211)

The present invention relates to releasable self-locking couplings comprising a coupler and a receiver, and more particularly to self-locking couplings of the kind in which the coupler includes a clamping rod terminating in a one-sidedly overhanging clamping head which can be moved into a position underlying the rim of a receiving opening in the receiver and is then locked in said underlying position thereby locking together the coupler and the receiver. The coupling is released by freeing the locked clamping head and withdrawing it from the receiving opening. Couplings of this kind are shown, for instance, in my prior Patents 2,464,543 and 2,674,774.

A straight pull applied to a coupling of the kind above referred to, will produce a shear load on the overhanging clamping head. Accordingly, the straight pull which the coupling can sustain, is substantially determined by the shear load which the clamping head can sustain and such shear load is very high, even for comparatively light clamping rods and heads.

In many fields of application in which the use of couplings of the kind herein referred to is highly advantageous, the coupling is or may be subjected not only to a substantially straight pull, but also to a side load. Such side load produces a bending force upon the clamping rod and hence the side load which the coupling can sustain is primarily determined by the resistance of the clamping rod to the bending force. For reasons of space and economy, the bending strength of the rod can be increased only within rather narrow limits as such increase entails a corresponding increase of all the other dimensions of the coupling.

Broadly speaking, it is the object of the present invention to provide a novel and improved coupling of the general kind above referred to, which for a given size can sustain a much higher side load than couplings of this type as heretofore known.

A more specific object of the invention is to provide a novel and improved coupling, the coupler of which is substantially relieved of the bending force applied to the clamping rod by a side load.

Another object of the invention is to provide a novel and improved coupling, the coupler and receiver of which coact with each other to guide and laterally support the clamping rod, directly or indirectly, in at least one plane longitudinally spaced from the plane of the receiver opening. As a result, the coupling is strongly reinforced in respect to a bending force applied thereto without actually increasing the dimensions of the clamping rod thereby correspondingly increasing the side load which the coupling can sustain.

Still another object of the invention is to provide a novel and improved coupling in which the aforementioned guidance and lateral support of the clamping rod become automatically effective when the coupler is locked to the receiver.

A further object of the invention is to provide a novel and improved coupling in which neither the activation nor the release of the guidance and the lateral support for the clamping rod require any specific action on the part of the operator and also do not require any manipulation of the coupling different from the usual and familiar manipulation of the coupling.

A still further object of the invention is to provide a novel and improved coupling which comprises safety means which, when applied, prevent an accidental or careless release of the locked coupling. As couplings of the kind herein referred to, can be readily released under full load, an accidental or careless release under load may result in serious damage or injury to personnel.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 1 is a perspective view of a coupling according to the invention, the coupler and receiver of the coupling being shown detached from each other.

FIG. 2 is a sectional view of a modification of the coupling, the coupler and the receiver being shown detached.

FIG. 3 is a sectional view of the coupling of FIG. 2, but showing the coupler in an intermediate stage of the locking operation.

FIG. 4 is a sectional view showing the coupler of FIG. 2 fully locked to the receiver of FIG. 2.

FIG. 5 is a sectional view of another modification of the coupling, the coupler and the receiver being shown detached from each other.

FIG. 6 is a sectional view showing the coupler and the receiver of FIG. 5 locked to each other.

FIG. 7 is a sectional view of still another modification of the coupling, the coupler being shown locked to the receiver.

FIG. 8 is a perspective view of a coupler according to the invention equipped with safety means, and FIG. 9 is a perspective view of a coupler similar to FIG. 8, but modified as to certain features.

Referring first to FIG. 1 in detail, the coupling according to this figure comprises a coupler 1 and a receiver 2, as do all other couplings according to the invention.

The receiver comprises a clamping rod 3 terminating on one end in a clamping head 4 one-sidedly overhanging the clamping rod and on the other end in an eye, hook or other suitable fastening means 5; an eye being shown to which a rope 6 is attached. A locking slide 7 is disposed slidable alongside the clamping head. The slide can be withdrawn relative to the clamping head and its length is such that in the fully protruding position of the slide (which is shown in FIG. 1), the tip of clamping head 4 protrudes beyond the tip of slide 7. The tips of both the clamping head and the slide are preferably rounded as also shown. The clamping rod extends through a housing 8 which is longitudinally slidable relative to the clamping rod. Slide 7 extends into the housing, but is secured within the housing by any suitable means, for displacement of the slide jointly with the housing and relative to the clamping rod. A spring (not shown) within the housing urges the housing and with it the slide toward the tip of the clamping rod, but such movement is limited to the forward position shown in FIG. 1. Housing 8 may be a stamping, and pressed into its top and serving as a closure are a seating collar 9 and a grip collar 10. The grip collar is marked "out" and the clamping rod is marked "in."

The receiver comprises a receiving plate 15 including a receiving opening 16 and a guide and support plate 17 including an opening 18. Plates 15 and 17 may be separately mounted on a base, but may be joined as shown by a common base portion 19 to form a unitary structure. The base portion serves as a mounting plate which is provided for this purpose with one or several holes through which the receiver may be screwed to a support, for instance, by means of screws 20. However, the receiver of a coupling according to the invention need not to be a stationary receiver as will appear from the subsequent description. The receiver of FIG. 1 may be drop-forged.

The diameter of receiving opening 16 and the peripheral outlines of the clamping head-locking slide assembly are so correlated that the clamping head alone fits the diameter of receiving opening 16 and the combined peripheral outline of the clamping rod portion within housing 8 and the locking slide also fits the diameter of receiving opening 16, but that the combined peripheral outline of the clamping head and the locking slide are in excess of the diameter of receiving opening 16. The diameter of opening 18 and of the housing 8 are so correlated that the diameter of the housing leaves a substantial clearance between housing 8 and the wall of opening 18, but that the diameter of collar 9 just fits opening 18 with grip collar 10 overhanging the opening and preferably also the outer peripheral rim of plate 17 to facilitate gripping of collar 10.

The coupling as shown in FIG. 1 is suitable, for instance, as a marine coupling and more specifically as a ski-tow coupling. Couplings for such purpose are subjected to a considerable straight pull load, but also to a side load which may vary its direction between straight and 90°.

The coupling is locked to the receiver, which may be visualized as being mounted aft on a boat, by gripping the clamping rod at or near its eye end 5 and inserting the housing 8 through opening 18 so that the protruding tip of clamping head 4 enters receiving opening 16. When now the clamping rod is pressed forward, that is, toward plate 15, housing 8 and with it the locking slide will be retracted relative to the clamping head and the clamping rod against the action of the spring (not shown) within housing 8, due to the fact that the tip of the locking slide 7 will be arrested by engagement with the rim of receiving opening 16. As a result, the clamping head will penetrate deeper into receiving opening 16 and when the clamping head has fully passed through the opening, space will become available for the locking slide 7 within the receiving opening since a portion of the clamping rod which is of lesser peripheral outline than the clamping head and initially within housing 8, now occupies the receiving opening. As a result, the spring within housing 8, which has become tensioned during the retraction of the housing, will snap the locking slide toward and into the receiving opening alongside the clamping head. During such penetration into the receiving opening, the slide will displace the clamping rod portion laterally within the receiver opening. The receiving opening is now fully occupied by the locking slide and the respective portion of the clamping rod whereby the overhanging clamping head is locked in a position underlying the rim of the receiving opening on the side of plate 15 opposite to the side of insertion thus locking the coupler to the receiver.

As is apparent from the previous description, the housing occupies a position eccentric relative to the receiving opening when and while the clamping head passes through the receiving opening, the diameter of housing 8 relative to the diameter of support opening 18 permitting such eccentric position of the housing. Collar 9 is still clear of opening 18 during this intermediate stage of the locking operation. The longitudinal spacing between plates 15 and 17 is so selected that collar 9 reaches the rim of opening 18 only at the beginning of the final stage of the locking operation, that is, when the locking slide snaps into receiving opening 16 alongside the respective clamping rod portion. Simultaneous with this forward movement of the locking slide, housing 8 also jumps from its eccentric position into a position concentric with receiving opening 16, thus permitting entry of collar 9 into support opening 18. Upon completion of the locking operation, collar 9 is seated within opening 18 and grip collar 10 abuts against the respective side of plate 17, or is closely adjacent thereto.

To release the coupler from the receiver, grip collar 10 is gripped and pulled into the direction away from the receiver. As a result, locking slide 7 which moves jointly with housing 8, is retracted from its position within receiving opening 16. The clamping head is now no longer locked in its position overhanging the rim of plate 15 and can be withdrawn through openings 16 and 18. The internal mechanism of the coupling and its function will become more fully apparent from the subsequent description of FIGS. 2 through 4 as the locking mechanism of FIG. 1 and its function are the same in principle as the locking mechanism of FIGS. 2 through 4, even though the specific configurations of the housing and the clamping rod and its head are somewhat different.

As is apparent from the previous description, the coupler is locked to the receiver by simply pushing the coupler into the receiver. As is further apparent, the coupler is supported in the plane of plate 15 and also in the plane of plate 17. These two planes of support are longitudinally so spaced that the comparatively weakest part of the coupler is held between the two plates. Due to the seating of the collar 9 in plate 17, the weakest part of the coupler and especially the clamping rod is relieved of practically all bending stresses due to a side load. The side load will be taken up by the collar, the housing and the heaviest part of the rod including eye 5. At the same time, the guidance and support of the housing portion of the coupler and the clamping rod portion therein do not impede in any way the free swiveling action of the coupler when locked to its receiver.

It has been found that a coupling, the coupler of which is supported and guided according to the invention, is capable of taking up tensile and side loads of practically equal force.

FIGS. 2, 3 and 4 show a coupling of a design smaller and lighter than that of FIG. 1. The coupling of FIGS. 2 through 4 is particularly suitable for use as a lanyard coupling, which is used in aircraft to fasten the lanyard of the parachute of the pilot to a wall. Such coupling requires a tensile and side load of about 100 lbs., in all directions.

The coupling again comprises a coupler 1 and a receiver 2. The coupler comprises a clamping rod 25 which is in principle identical with the rod of FIG. 1, but of lighter design in that it is bent from D-wire. The rod 25 is set off and bent back on one end to form a clamping head 26 one-sidedly overhanging the clamping rod proper, and on the other end the clamping rod is bent in an eye 27 for attachment of a rope or wire thereto. The clamping rod extends through a cup 28 which is telescoped in a housing 29 similar to housing 8 of FIG. 1. Housing 29 mounts, fixedly secured thereto or integral with it, a seating collar 30 and a grip collar 31. The bottom wall of housing 29 has an opening 32 from which protrudes clamping head 26 and which also provides space for a locking slide 33. The locking slide is slidable relative to the clamping rod and also to housing 29. A spring 34 urges the assembly into the relative position of the components shown in FIG. 2. A shoulder 33' on slide 33 and a washer 35 limit displacement of the locking slide toward the tip of the clamping head by the action of spring 34.

The receiver comprises a deep cup 40 having in its bottom wall a receiver opening 41. The receiver cup has a flange 42 with screw holes 43 by means of which the receiver can be stationarily mounted, but a free or non-captive receiver may also be used with the coupler of FIG. 2.

The relative peripheral outlines of the clamping head, the clamping rod, the locking slide and receiver opening are again correlated as described in connection with FIG. 1, that is, the peripheral outline of the clamping head alone and also the combined peripheral outline of the clamping rod and the locking slide will fit the receiving opening 41, but the combined peripheral outline of the clamping head and the locking slide are in excess of that of the receiving opening. The diameter of seating collar 30 just fits the inner diameter of cup 40, but the diameter of housing 29 leaves considerable clearance between the inner wall of cup 40 and housing 29 when the latter is inserted in cup 40.

In order to lock the coupler to the receiver, the operator grips eye 27 and inserts the protruding tip of clamping head 26 in the receiver opening and then pushes the coupler toward the bottom of cup 40. As a result and as previously described in connection with FIG. 1, the clamping head will penetrate deeper into receiving opening 41, but the locking slide is pushed back relative to the clamping head by engagement of the locking slide with the rim of the receiving opening.

FIG. 3 shows the condition in which the clamping head has nearly penetrated the receiving opening. This figure also shows that housing 29 and with it collar 30 are as eccentric relative to cup 40 when and while the clamping head occupies receiving opening 41. The diameter of housing 29 permits such eccentricity of housing 29 within cup 40, and as also previously described, the length of the clamping rod assembly and of housing 29 in relation to the depth of cup 40 are such that housing 29 can occupy the position shown in FIG. 3 while collar 30 is still clear of cup 40.

When now the clamping rod 25 is pushed still deeper through receiving opening 41, the straight portion of the clamping rod will enter the receiving opening thereby making space available for locking slide 33. The same will be snapped into the receiving opening towards the clamping head and at the same time housing 29 will jump from the eccentric position of FIG. 3 into the concentric position of FIG. 4 and collar 30 will be seated in cup 40. Space for such seating of collar 30 is provided by a recess 45 in the bottom of cup 40. This recess or indentation accommodates housing 29, and both the coupler and the receiver now occupy the position of FIG. 4 in which the coupler is locked to the receiver.

As is apparent from a comparison of FIG. 4 with FIG. 1, the upper portion of cup 40 in which collar 30 is seated corresponds in function to support plate 17 of FIG. 1, but in contradistinction to FIG. 1, the clamping rod in FIG. 4 is indirectly guided and supported by collar 30 which braces the rod through cup 28. However, as previously mentioned, the design of FIG. 4 is intended primarily for smaller tensile and side loads than the design of FIG. 1 and for such smaller loads, the clamping rod is fully adequately supported to sustain the required load forces in all directions. Furthermore, whereas in the design of FIG. 1 the clamping rod is guided in two planes, namely, at plates 15 and 17, the coupler of FIG. 4 is additionally supported, namely, at the plane of recess or countersink 45 engaged by housing 29.

FIGS. 5 and 6 show a coupling in locked and released position respectively which is particularly suitable for use as a wire rope coupling employed for instance, to attach loads to helicopters. Wire ropes 50 and 51 are crimped into integral terminals on the coupler and the receiver respectively.

The coupler again comprises a clamping rod 52 terminating on one end in an enlarged one-sidedly overhanging clamping head 53 and is continued on the other end to form a terminal 54 for wire rope 51. The clamping rod is slidable in a housing 55 which is tubular in design and mounts at one end, fixedly secured thereto or integral with it, a seating collar 56 and a grip collar 57. Housing 55 also houses a locking slide 58 which is secured to housing 55 by a pin 59 for joint movement with the housing. A spring 60 urges the clamping rod into the position relative to the housing and the locking slide shown in FIG. 5. The coupler design of FIG. 5 has the advantage that the housing 55 can stand rougher treatment than the housing 29 of FIG. 2. Furthermore, the housing tends to support the clamping rod along its entire length due to the movement of the locking slide together with the housing. The coupler design of FIG. 5 permits minimum dimensions for a given tensile and side load.

The receiver comprises a tubular housing 65 which is tapered on one end to form a terminal 66 for wire rope 50. A plate 67 including a receiver opening 68 and recessed at 69 is fixedly secured within housing 65 at the appropriate longitudinal distance from the edge of housing 65.

The operation of the coupler according to FIGS. 5 and 6 is evident from the figures and the description of the preceding exemplifications of the invention.

The clamping rod is again supported in three planes, to wit, at the level of the clamping rod in the receiver opening, at the base of housing 55 in recess 65 and at the level of seating collar 56.

FIG. 7 shows a coupling according to the invention which is similar in principle to that of the previously described couplings in that the coupler is locked to the receiver by a clamping head overhanging the receiver opening and the coupler is supported against side loads at several longitudinally spaced planes.

The coupler of the coupling according to FIG. 7, comprises a clamping rod 70 terminating on one end in a one-sidedly overhanging clamping head 71. The clamping rod extends slidably through a housing 72 which has on its end facing the clamping head, a narrowed extension 73 from which the clamping head protrudes. A spring 74 within housing 72 urges the clamping rod and the housing into a position in which the respective edge of the clamping head abuts against the rim of housing portion 73. Spring 74 abuts on one end against the base of the wider housing 72 and on the other end against a shoulder 75. Housing 72 is enlarged at its free edge to form a grip collar 76. A seating collar 77 is secured upon housing 72, just below grip collar 76.

A coupler, as shown in FIG. 7, may mount an auxiliary aerial 78, the lower end of which forms the shoulder 75. The auxiliary aerial may be used on air-sea rescue boats and is erected by inserting the coupler in the receiver which in turn is secured to an appropriate part of the boat, but, of course, the receiver may also be mounted in any other location and may also be a free receiver. The portion of the aerial protruding into housing 72 provides lateral support for the clamping rod in the housing. Such support can also be obtained by reinforcing a part of the clamping rod itself within the housing.

The receiver is shown as a sleeve 79, open on one end and having a flange 80 on the other end by means of which the receiver is screwed to a board 81. The receiver assembly is preferably surrounded by a water-proof rubber housing 82. A receiver plate 83 is fixedly secured within sleeve 79. This plate has a receiver bore or opening 84. The diameter of this opening is such that it will fit clamping head 71 and also housing extension 73. The axial length of receiver opening 84 in relation to the axial length of housing extension 73 is such that when housing extension 73 is fully inserted in the receiver opening, clamping head 71 is compelled to protrude from housing extension 73 as shown in FIG. 7.

Let it be assumed that the coupler is detached from the receiver and that it is desired to lock the coupler to the receiver as shown in FIG. 7. When the coupler is separated from the receiver, the clamping head is pulled back against the rim of housing extension 73 by the action of spring 74. To lock the coupler to the receiver, the operator grips aerial 78, which is marked "in," near grip collar 76 and inserts the clamping head into receiving opening 84. By pushing the aerial downward, clamping head 71 is compelled to penetrate through receiving opening 84. For the time being, housing extension 73 cannot follow the clamping head as it is held eccentric relative to the receiving opening when and while the clamping head occupies the receiving opening. When the clamping head has fully penetrated the receiving opening, it will jump into the position overhanging the receiver plate 83 by the pressure of loaded spring 74. The housing extension 73 is now concentric with opening 84 and will enter the receiving opening as is shown in the figure. The relative dimensions of housing 72, seating collar 77 and the longitudinal length of the components involved are again so correlated that space is available for the aforedescribed longitudinal and lateral motions. The movement of housing extension 73 into the receiving opening also compels collar 77 to follow housing 72 into sleeve 79 and thus to seat itself in the sleeve.

To release the coupler, grip collar 76 is pulled upwardly thus withdrawing first housing extension 73 from the receiving opening and finally the clamping head through the receiving opening.

As is apparent, the clamping rod of FIG. 7 is steadied at seating collar 77. In addition, the front part 73 of the housing steadies the clamping rod so that the coupler is capable of resisting side loads and pull loads of about equal force.

As may be noted, the clamping rod 70 and the grip collar 76 are marked IN and OUT respectively in this embodiment also to facilitate the correct manipulation of the coupler. The word IN in the embodiment of FIG. 7 and also in the embodiment of FIG. 5 disappears into the housing when the coupler is locked due to the difference in the relative position of the clamping rod and the housing, thus eliminating any possible confusion as to the component to be operated for release.

Slide-less couplers of the kind shown in FIG. 7 are described, for instance, in my prior Patent 2,674,774.

FIG. 8 shows a coupler design, the locking mechanism of which is readily understandable from the previous description. The housing of the coupler includes the also aforedescribed seating collar which by coaction with an appropriately designed receiver enables the coupler to take up comparatively heavy side loads.

In contrast to the previously described coupler designs, the clamping rod of the coupler of FIG. 8 is continued in a threaded portion 90 upon which may be screwed a nut for attachment of a load. As is evident, the coupler of FIG. 8 may coact with a receiver as shown, for instance, in FIG. 2.

The coupler of FIG. 8, as well as all previously described couplers, is completely vibration and shock proof. It can be released only by pulling up the locking slide against the action of the spring urging the slide into the opposite direction. Such release can be effected at any time and also under full load as the force of the load will not manifest itself in an increased resistance of the locking slide to withdrawal. As an accidental or careless release of the coupler, especially under full load, may be dangerous in certain fields of application, for instance, in military applications, a safety device is provided to prevent such accidental or careless release. This safety device is shown as a nut 91 retained on threaded portion 90. When this nut is screwed so close to the upper face of grip collar 92 that the distance between nut 91 and collar 92 is less than the distance through which the locking slide must be lifted to clear the receiving opening, the coupler cannot be released. The safety position of nut 91 may be indicated by a legend "safe when down."

Nut 91 may, of course, be screwed down into engagement with collar 92, but this is not necessary to effect the safety action. However, the possibility of screwing nut 91 tightly against collar 92, permits use of the coupler of FIG. 8 as a sheet clamp. When thus used, the holes through the sheets to be clamped together constitute the receiving opening coacting with the clamping head in the locking slide of the coupler.

FIG. 9 shows a coupler similar to the coupler of FIGS. 5 and 6, but of somewhat heavier design. The locking mechanism and the function of the coupler of FIG. 9 are apparent from the previous description. The coupler according to FIG. 9 is equipped with a safety device in the form of a small spring loaded plate 93 which is set into the projecting portion 94 of the clamping rod. Plate 93 normally projects over the edge in the top opening of seating collar 95 of the housing. This makes it impossible to push down the clamping rod for locking action, or to pull up the housing for release action until plate 93 is pressed in flush with rod portion 94. Once the plate 93 has entered the housing, it is held in its pressed-in position by engagement with the housing.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A releasable self-locking coupling, comprising a coupler including a clamping rod terminating on one end in a one-sidedly overhanging clamping head, a housing, said clamping rod extending through said housing and protruding with its clamping head end from one end of the housing, said housing and said rod being longitudinally slidable relative to each other, guide means for retaining the clamping head in an eccentric position in reference to an aperture in a receiving member in which position the clamping head overhangs the receiving member aperture, and a seating collar on the outside wall of the housing longitudinally spaced from the housing end from which the clamping head protrudes; and a receiver including an apertured receiving member and an apertured support member longitudinally aligned and spaced from each other, said receiving member aperture fitting the clamping head and said support member aperture providing clearance for passage of the housing but fitting the seating collar, whereby seating of the collar in said support member opening supports the clamping rod in a plane longitudinally spaced from the plane in which the clamping head is retained in the receiving member aperture.

2. A releasable self-locking coupling, comprising a coupler including a clamping rod terminating on one end in a one-sidedly overhanging clamping head, a housing, said clamping rod extending through said housing and protruding with its clamping head end from one end of the housing, said housing and said rod being longitudinally slidable relative to each other, a locking slide slidable along the clamping rod on the side thereof opposite the overhanging clamping head, said slide being secured to the housing for joint withdrawal of the housing and the slide relative to the clamping head, and a seating collar on the outside wall of the housing longitudinally spaced from the housing end from which the clamping head protrudes; and a receiver including an apertured receiving member and an apertured support member longitudinally aligned and spaced from each other, said receiving member aperture fitting the peripheral outline of the clamping head and also the combined peripheral outline of the locking slide and the clamping rod portion adjacent to the clamping head and said support member aperture providing clearance for passage of the housing but fitting the seating collar, seating of the locking slide in the receiving member aperture alongside the clamping rod retaining the clamping head in an eccentric position in reference to the receiving member aperture in which position the clamping head overhangs the receiving member aperture, and seating of the collar in said support member aperture supports the clamping rod in a plane longitudinally spaced from the plane in which the clamping head is retained in the receiving member aperture.

3. A coupling according to claim 2 wherein the peripheral outline of the clamping rod fits the inner peripheral outline of the coupler housing whereby the clamping rod, the coupler housing and the receiving member are in laterally supporting, direct engagement with each other when the clamping head is retained in the receiving member aperture and the collar is seated in the receiving member.

4. A releasable self-locking coupling, comprising a coupler including a clamping rod terminating on one end in a one-sidedly overhanging clamping head, a housing, said clamping rod extending through said housing and protruding with its clamping head from one end of the housing, said housing and said rod being longitudinally slidable relative to each other, a locking slide slidable along the clamping rod on the side thereof opposite the overhanging clamping head, said slide being secured to the housing for joint withdrawal of the housing and the slide relative to the clamping head, and a seating collar on the outside wall of the housing longitudinally spaced from the housing end from which the clamping head protrudes; and a receiver including a cup shaped receiving member having in its bottom a receiving opening, said receiving opening fitting the peripheral outline of the clamping head and also the combined peripheral outline of the locking slide and the clamping rod portion adjacent to the clamping head and the inner peripheral outline of the receiving member providing clearance for passage of the housing but fitting the seating collar, seating of the locking slide in the receiving opening alongside the clamping rod retaining the clamping head in an eccentric position in reference to the receiving opening in which position the clamping head overhangs the receiving opening, and seating of the collar in said receiving member laterally supporting the clamping rod in a plane longitudinally spaced from the plane in which the clamping head is retained in the receiving opening.

5. A coupling according to claim 4 and further comprising a cup member having a bottom opening through which the clamping rod is fitted, said cup member protruding into the coupler housing with a sliding fit and being disposed adjacent to the housing portion mounting said collar, whereby the clamping rod is laterally supported by the receiving member and the cup member when the clamping head is retained in the receiving opening and the collar is seated in the receiving member.

6. A coupling according to claim 4 wherein said cup shaped receiving member has in its bottom a recess concentric with the receiving opening and fitting the base portion of the coupler housing, the longitudinal distance between the base of said recess and the rim of the receiving member being equal to the longitudinal distance between the bottom of the coupler housing and the upper rim of the collar thereon.

7. A coupling according to claim 1 wherein a gripping collar is secured to the outside of the coupler housing on the side of the collar distal from the housing end from which the clamping head protrudes, said gripping collar being wider than said seating collar.

8. A coupling according to claim 7 wherein said seating collar and said gripping collar are integral with the housing.

9. A releasable self-locking coupling, comprising a coupler including a clamping rod terminating on one end in an one-sidedly overhanging clamping head, a housing, said clamping rod extending through said housing and protruding with its clamping head end from one end of the housing, said housing and said rod being longitudinally slidable relative to each other, said housing including a set-off guide portion of reduced peripheral outline at the end of the housing from which the clamping head protrudes, said clamping head overhanging the rim of said guide portion, and a seating collar secured on the outside of the wide housing portion; and a receiver including an apertured receiving member and an apertured support member, the aperture of the receiving member having a peripheral outline fitting the clamping head and also the narrow guide portion and a depth less than the longitudinal length of said guide portion, and the aperture of the support member having an inner peripheral outline providing clearance for a limited lateral movement of the wide portion of the coupler housing relative to said support member but seating the collar thereon, passage of the clamping head through the support member aperture and the receiving member aperture and insertion of the guide portion of the coupler housing in the receiving member aperture retaining the clamping head in a position overhanging the said aperture, and seating of the collar in the support member laterally supporting the wide housing portion in the support member.

10. A coupling according to claim 9 wherein said clamping rod has secured thereto a part protruding into the wide coupler housing portion and fitting the inner peripheral outline thereof, said part providing lateral support of the clamping rod within the coupler housing.

11. A releasable self-locking coupling, comprising a coupler including a clamping rod terminating on one end in an one-sidedly overhanging clamping head, a housing, said clamping rod extending through said housing and protruding with its clamping head end from one end of the housing, said housing and said rod being longitudinally slidable relative to each other, said housing including a set-off guide portion of reduced peripheral outline at the end of the housing from which the clamping head protrudes, said clamping head overhanging the rim of said guide portion, and a seating collar secured on the outside of the wide housing portion; and a receiver including a tubular housing, and an end wall closing on one end of said housing, said end wall including a receiving opening having a peripheral outline fitting the clamping head and also the narrow guide portion of the coupler housing, and the inner peripheral outline of the receiver housing providing clearance for a limited lateral movement of the wide portion of the coupler housing within the receiver housing but seating the collar in the coupler housing, passage of the clamping head through the receiving opening and insertion of the guide portion of the coupler housing in said receiving opening retaining the clamping head in a position overhanging said receiving opening, and seating of the collar in the open end of said receiver housing laterally supporting the coupler housing in said receiver housing.

12. A coupling according to claim 11 wherein said receiver housing is encased in a flexible water-proof shell open at the open end of the receiver housing and closed at the other end, said shell providing space for the clamping head between the end wall and the bottom of the shell.

13. A coupler for coaction with a receiver of a self-locking coupling, said coupler comprising a clamping rod terminating on one end in an one-sidedly overhanging clamping head, a housing, said clamping rod extending through said housing and protruding with its clamping head end from one end of the housing, said housing and said rod being longitudinally slidable relative to each other, and a seating collar on the outside wall of the housing longitudinally spaced from the housing end from which the clamping head protrudes, said clamping rod extending with its other end from said housing, and safety means supported on said extended clamping rod portion, said safety means being selectively settable in a position limiting longitudinal movement of the housing relative to the clamping rod to a predetermined distance and in a position permitting movement beyond said distance, said predetermined distance constituting a safe distance.

14. A coupler according to claim 13 wherein said extended clamping rod portion is threaded, and said safety means comprises a nut screwed upon said threaded portion.

15. A coupler according to claim 13 wherein said safety means comprises a spring loaded member fitted in a recess of said extended clamping rod portion, said member being selectively movable between a position protruding from said rod portion and a position retracted therein.

16. A sheet clamp for releasably clamping together several sheets by locking the clamp in openings in register through the sheets, said sheet clamp comprising a clamping rod terminating on one end in an one-sidedly overhanging clamping head, a housing, said clamping rod extending through said housing and protruding therefrom on one end with said clamping head and on the other end with a clamping rod portion, said housing and said clamping rod being longitudinally slidable relative to each other, a seating collar on the outside wall of the housing longitudinally spaced from the housing end from which the clamping head protrudes, and releasable locking means mounted on the clamping rod portion protruding from the respective housing end, said locking means being selectively movable between a position locking relative longitudinal movement of the clamping rod and the housing and a position freeing the clamping rod and the housing for longitudinal movement relative to each other.

17. A sheet clamp according to claim 16 wherein said protruding rod portion is threaded and a nut is screwed upon said threaded portion, said nut being movable between a position engaging the collar, said position constituting the locking position, and a position disengaged from the collar, said latter position constituting the freeing position.

References Cited in the file of this patent

UNITED STATES PATENTS

| | | |
|---|---|---|
| 2,365,648 | Rossmann | Dec. 19, 1944 |
| 2,739,292 | Modrey et al. | Mar. 20, 1956 |